(12) United States Patent
Shimada

(10) Patent No.: US 6,901,450 B1
(45) Date of Patent: May 31, 2005

(54) MULTIPROCESSOR MACHINE AND CACHE CONTROL METHOD FOR PROVIDING HIGHER PRIORITY TO SHARED CACHE THAT IS ACCESSED BY MULTIPROCESSORS

(75) Inventor: Kentaro Shimada, Tokyo (JP)

(73) Assignee: Hitachi, Ltd., Tokyo (JP)

(*) Notice: Subject to any disclaimer, the term of this patent is extended or adjusted under 35 U.S.C. 154(b) by 853 days.

(21) Appl. No.: 09/667,716

(22) Filed: Sep. 22, 2000

(51) Int. Cl.[7] ............................................... G06F 13/00
(52) U.S. Cl. .................... 709/232; 709/238; 711/133; 711/144; 711/145; 711/122; 711/130
(58) Field of Search ................................. 709/232, 238; 711/133, 144, 145, 122, 130, 135, 136, 141, 118, 121, 124

(56) References Cited

U.S. PATENT DOCUMENTS

| | | | | |
|---|---|---|---|---|
| 5,276,848 A | * | 1/1994 | Gallagher et al. | 711/121 |
| 5,678,026 A | * | 10/1997 | Vartti et al. | 711/152 |
| 5,692,149 A | * | 11/1997 | Lee | 711/133 |
| 5,809,537 A | * | 9/1998 | Itskin et al. | 711/146 |
| 5,937,431 A | * | 8/1999 | Kong et al. | 711/133 |
| 5,963,974 A | * | 10/1999 | Arimilli et al. | 711/130 |
| 6,014,690 A | * | 1/2000 | VanDoren et al. | 709/215 |
| 6,185,658 B1 | * | 2/2001 | Arimilli et al. | 711/133 |
| 6,351,791 B1 | * | 2/2002 | Freerksen et al. | 711/146 |
| 6,418,514 B1 | * | 7/2002 | Arimilli et al. | 711/133 |
| 6,591,321 B1 | * | 7/2003 | Arimilli et al. | 710/110 |

FOREIGN PATENT DOCUMENTS

| | | |
|---|---|---|
| JP | 8-263374 | 10/1996 |
| JP | 9-293060 | 11/1997 |
| JP | 11-272557 | 10/1999 |

* cited by examiner

*Primary Examiner*—Hong Kim
(74) *Attorney, Agent, or Firm*—Mattingly, Stanger, Malur & Brundidge, P.C.

(57) ABSTRACT

In multiprocessor machines and chip multiprocessor systems in particular, the object of the present invention is to reduce data communication between the LSI chip and external components and to avoid restrictions in communication volume resulting from the LSI pin count. Sets in tag and data blocks of a shared cache include a shared bit S. When data is replaced for a cache miss, the contents of the shared bit S are checked and the side with the shared bit S set to 0 in the tag and data block is selected for data replacement. This allows data shared by a plurality of processors to be left in the shared cache, and the data transfer between the shared cache and the main memory can be reduced.

11 Claims, 11 Drawing Sheets

Fig. 5

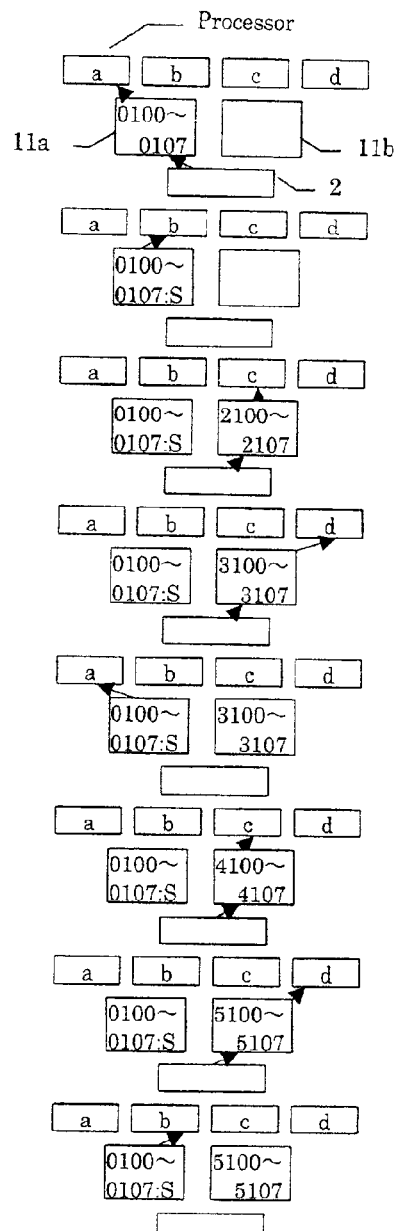

An example of behavior of said invention (Fig.1)
Time tick in parentheses (1) Processor a: read address 0100~0107;
8 bytes data transfer from main storage 2 to tag and data block 11a.

(2) Processor b : read address 0100~0107;
read data from tag and data block 11a, set shared bit S.

(3) Processor c : read address 2100~2107;
8 bytes data transfer from main storage 2 to tag and data block 11b.

(4) Processor d : read address 3100~3107;
8 bytes data transfer from main storage 2 to tag and data block 11b, again.

(5) Processor a : read address 0100~0107;
read data from tag and data block 11a (6) Processor c : read address 4100~4107;
8 bytes data transfer from main storage 2 to tag and data block 11b, again.

(7) Processor d : read address 5100~5107;
8 bytes data transfer from main storage 2 to tag and data block 11b, again.

(8) Processor b : read address 0100~0107;
read data from tag and data block 11a 40 bytes data transfer in all

Fig. 6

An example of behavior on Fig 3
Time tick in parentheses (1) Processor a: read address 0100~0107;
    8 bytes data transfer from main storage 2 to
    tag and data block 31a (2) Processor b : read address 0100~0107;
    read data from tag and data block 31a (3) Processor c : read address 2100~2107;
    8 bytes data transfer from main storage 2 to
    tag and data block 31b (4) Processor d : read address 3100~3107;
    8 bytes data transfer from main storage 2 to
    tag and data block 31a (5) Processor a : read address 0100~0107;
    8 bytes data transfer from main storage 2 to
    tag and data block 31b (6) Processor c : read address 4100~4107;
    8 bytes data transfer from main storage 2 to
    tag and data block 31a (7) Processor d : read address 5100~5107;
    8 bytes data transfer from main storage 2 to
    tag and data block 31b (8) Processor b : read address 0100~0107;
    8 bytes data transfer from main storage 2 to
    tag and data block 31a
         56 bytes data transfer in all

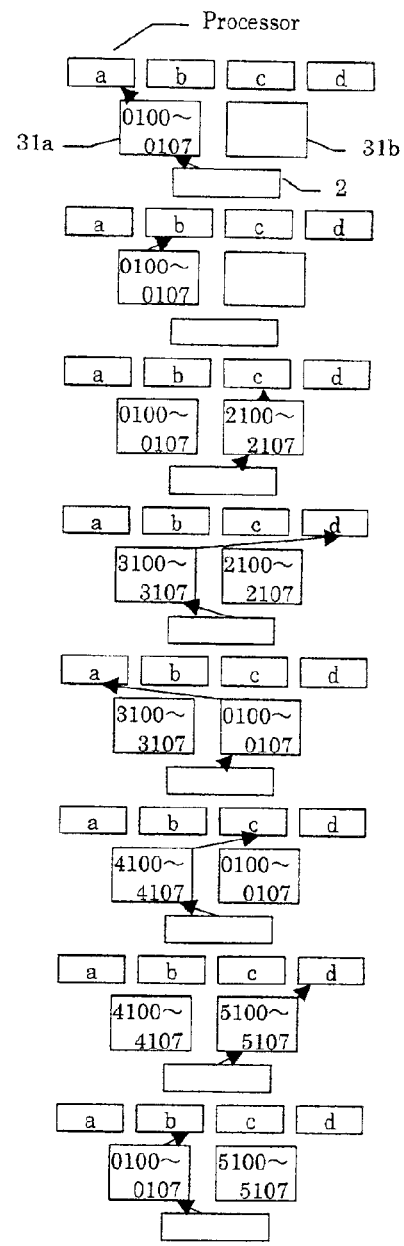

Fig. 10

An example of behavior of private cache of said invention (Fig.8)
Time tick in parentheses (1) Processor a : read address 0100~0107;
8 bytes data transfer from main storage 2 to shared cache 4(tag and data block 11a) and to private cache 7a(tag and data block 71a)

(2) Processor b : read address 0100~0107;
8 bytes data transfer from shared cache 4 to private cache 7b, set shared bit S in private cache 7a(tag and data block 71a)

(3) Processor a : read address 2100~2107;
8 bytes data transfer from main storage 2 to shared cache 4(tag and data block 11b) and to private cache 7a(tag and data block 71b)

(4) Processor a : read address 0100~0107;
read data from private cache 7a(tag and data block 71a)

(5) Processor a : read address 3100~3107;
8 bytes data transfer from main storage 2 to shared cache 4(tag and data block 11b) and to private cache 7a(tag and data block 71a)

(6) Processor a : read address 2100~2107;
read data from private cache 7a(tag and data block 71b)

(7) Processor a : read address 3100~3107;
read data from private cache 7a(tag and data block 71a)

24 bytes data transfer in all

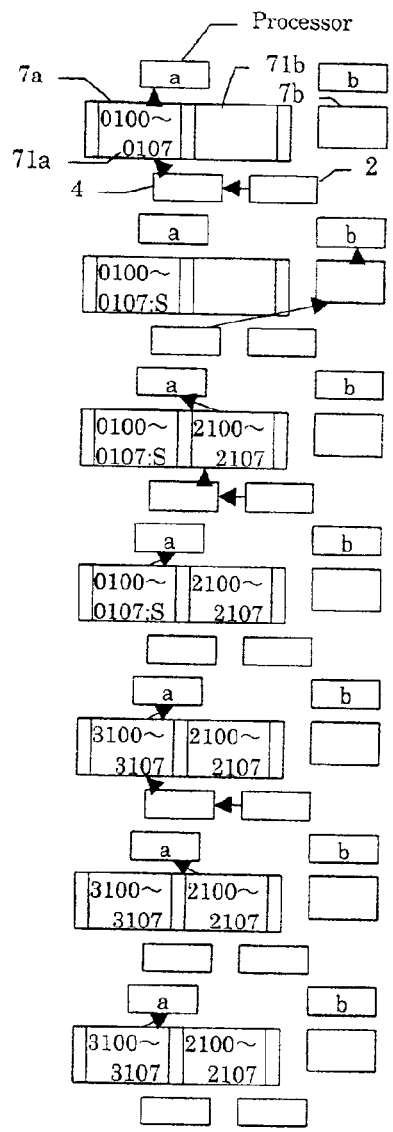

Fig. 11

An example of behavior of private cache on Fig.8

Time tick in parentheses

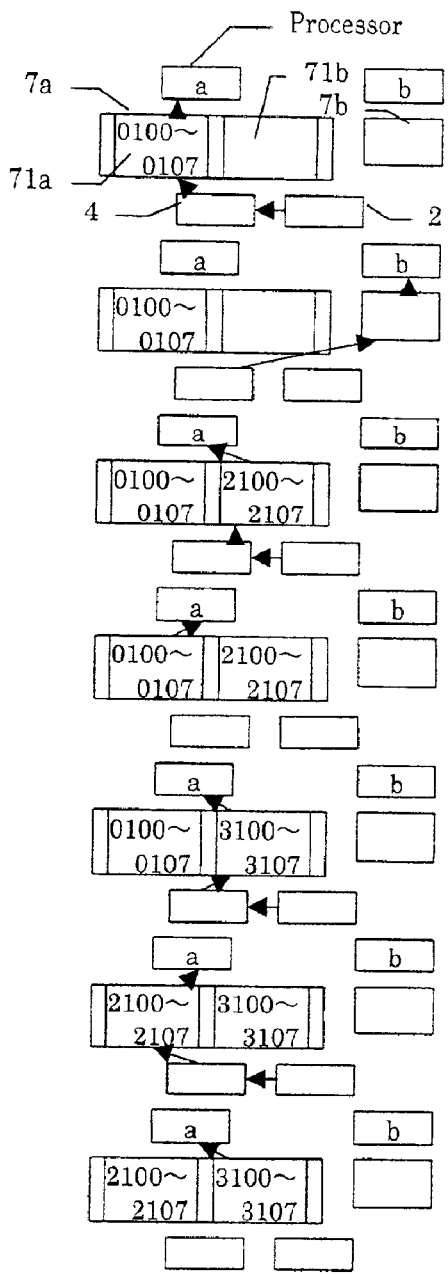

(1) Processor a : read address 0100~0107;
8 bytes data transfer from main storage 2 to shared cache 4(tag and data block 11a) and to private cache 7a(tag and data block 71a)

(2) Processor b : read address 0100~0107;
8 bytes data transfer from shared cache 4 to private cache 7b (3) Processor a : read address 2100~2107;
8 bytes data transfer from main storage 2 to shared cache 4(tag and data block 11b) and to private cache 7a(tag and data block 71b)

(4) Processor a : read address 0100~0107;
read data from private cache 7a(tag and data block 71a)

(5) Processor a : read address 3100~3107;
8 bytes data transfer from main storage 2 to shared cache 4(tag and data block 11b) and to private cache 7a(tag and data block 71b)

(6) Processor a : read address 2100~2107;
8 bytes data transfer from main storage 2 to shared cache 4(tag and data block 11b) and to private cache 7a(tag and data block 71a)

(7) Processor a : read address 3100~3107;
read data from private cache 7a(tag and data block 71b)

32 bytes data transfer in all

MULTIPROCESSOR MACHINE AND CACHE CONTROL METHOD FOR PROVIDING HIGHER PRIORITY TO SHARED CACHE THAT IS ACCESSED BY MULTIPROCESSORS

BACKGROUND OF THE INVENTION

The present invention relates to a technology for controlling cache in multiprocessor machines. More specifically, the present invention relates to cache controller in chip multiprocessors.

An example of a conventional technology for controlling multiprocessor cache is a technology that seeks to increase speed by reducing control hardware and control signal traffic from control data used to maintain consistency in data shared between the plurality of processors. Examples of this technology are described in Japanese laid-open patent publication number Hei 11-272557, Japanese laid-open patent publication number Hei 09-293060, and Japanese laid-open patent publication number Hei 08-263374.

With LSI chips, the data transfer between the chip and external components is restricted by the physical limitation of the number of chip pins. Thus, it would be desirable to reduce the communication between the chip and external components as much as possible. Thus, with chip multiprocessors in which two or more processors and a cache are integrated on an LSI chip, cache control must be performed to reduce the communication between the on-chip cache and external components.

In the conventional technology described above, the communication between the chip and external components cannot be reduced. On the other hand, the object of the conventional technology to simplify and increase the speed of control performed to maintain cache consistency is not a major issue since a large amount of data can be communicated between the on-chip processors.

SUMMARY OF THE INVENTION

In multiprocessor machines and chip multiprocessor systems in particular, the object of the present invention is to reduce data communication between the LSI chip and external components and to avoid restrictions in communication volume resulting from the LSI pin count. The overall system performance can be improved by achieving these objects.

In order to achieve these objects, a multiprocessor machine according to the present invention includes a plurality of processors and a first cache shared by said plurality of processors. The first cache is controlled so that, when storing data, it gives priority to data accessed by at least two processors of the plurality of processors. Also, second caches are used by each of the plurality of processors. If data stored in the second cache is accessed by a processor other than the processor owning the second cache, priority is not given to the second cache when storing data.

Also, the plurality of processors and the first cache are integrated on a single LSI chip. Also, the plurality of processors, the first cache, and the second cache are integrated on a single LSI chip.

Furthermore, first selecting means gives priority to areas containing data not accessed by at least two processors of the plurality of processors when selecting an area in the first cache to store new data.

Furthermore, second selecting means gives priority to areas containing data accessed by a processor other than the processor owning the second cache when selecting an area in the second cache to store new data.

Also, in order to achieve the objects described above, a method for controlling cache according to the present invention includes: a first step evaluating whether data stored in a cache shared by a plurality of processors is accessed by at least two processors from the plurality of processors; a second step selecting an area determined by the first step to not be accessed by at least two processors when storing new data to the cache; a third step selecting an area in the first cache if no area can be selected in the second step; and a fourth step storing the new data in an area of the first cache selected by either the second step or the third step.

Also, in the third step, an area in the first cache containing data with the lowest number of accessing processors of the plurality of processors is selected.

Also, the present invention includes: a first step evaluating whether data stored in a second cache associated with one of a plurality of processors was accessed by a processor other than a processor associated with the second cache; a second step selecting an area containing data determined in the first step to have been accessed by another processor when new data is stored in the second cache; a third step selecting an area of the second cache if no area can be selected in the second step; and a fourth step storing new data in an area of the second cache selected by either the second step or the third step.

BRIEF DESCRIPTION OF THE DRAWINGS

FIG. 5 is a drawing for the purpose of describing the operations of a system according to the present invention.

FIG. 6 is a drawing for the purpose of describing the operations of a system according to a comparative example of the present invention.

FIG. 10 is a drawing for the purpose of describing another system according to the present invention.

FIG. 11 is a drawing for the purpose of describing the operations of a system according to a comparative example of the present invention.

DETAILED DESCRIPTION OF THE PREFERRED EMBODIMENTS

The following is a description of the embodiments of the present invention.

Figure 1:
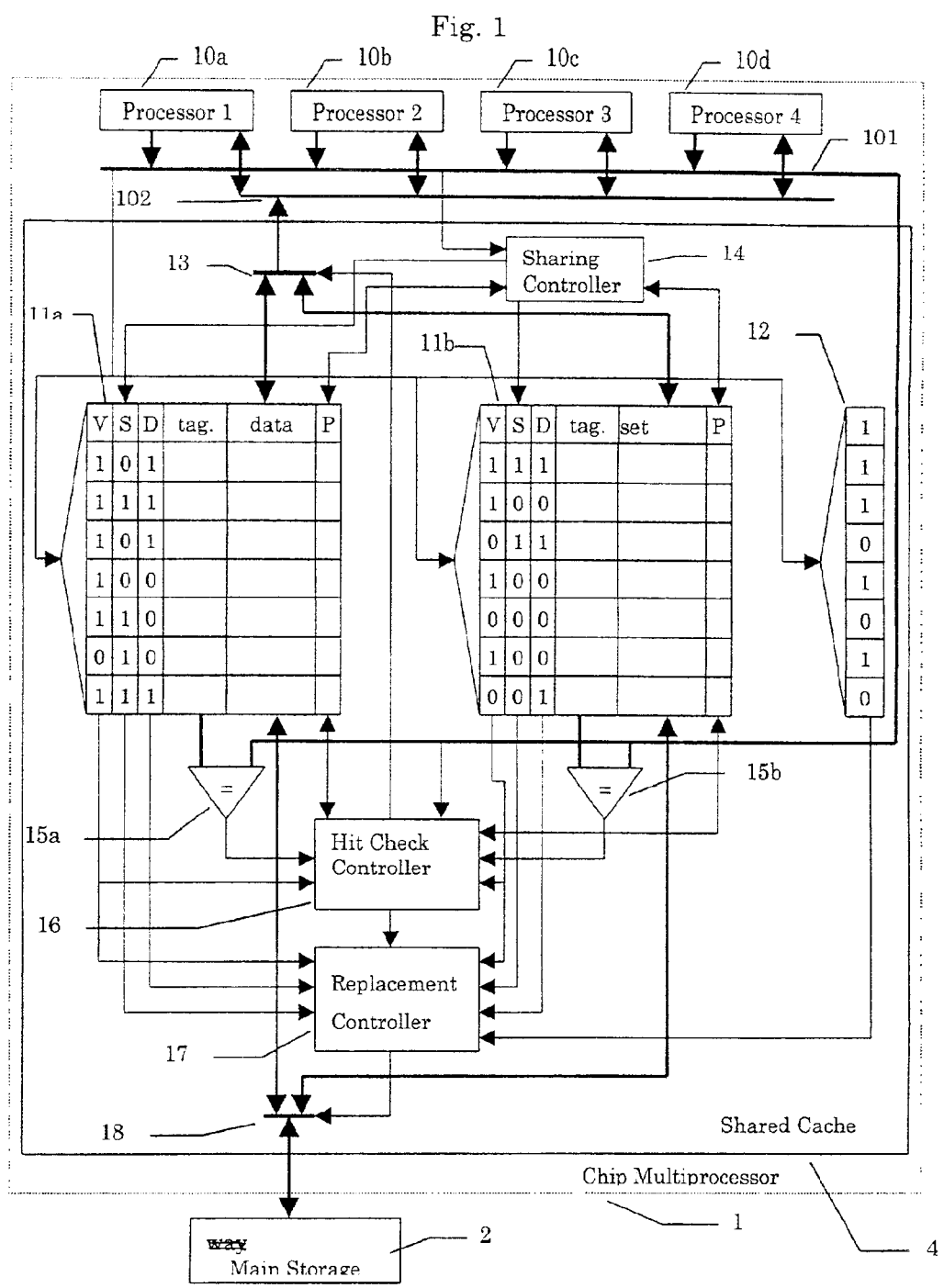
FIG. 1 is a example of drawing of the system architecture of a multiprocessor machine according to the present invention.

FIG. 1 is a drawing showing the system architecture of a chip multiprocessor equipped with a shared cache. A chip multiprocessor 1 includes four processors 10a–10d and a shared cache 4. In FIG. 1, the chip multiprocessor 1 is connected to a main storage 2, but it would also be possible to provide a separate cache interposed between these two elements.

The four processors 10a–10d share the cache 4 using a common data bus 102 and a common address bus 101 on the chip of the chip multiprocessor 1. The shared cache 4 includes: two-way tag and data blocks 11a, 1b; an LRU memory 12; a way selector 13 to the common data bus 102; a sharing controller 14; tag address comparators 15a, 15b; a hit check controller 16; a replacement controller 17; and a way selector 18 to an external data bus. The tag and data blocks 11a, 11b are formed from a plurality of sets selected based on a part of the memory address. In addition to tag address and data, each set stores a valid bit V, a shared bit S, a dirty bit D, and a processor number P for the processor that last accessed the data. Each set includes two groups of tag addresses, data, valid bits V, shared bits S, dirty bits D, and processor numbers P in the tag and data blocks 11a, 11b, and each of these groups is known as a way. For each set, the LRU memory 12 records the way that was most recently accessed.

The four processors 10a–10d access data using the common address bus 101 and the common data bus 102. When data is accessed, a part of the data address in the common address bus 101 is used to select a set to be referenced. Tag addresses corresponding to the selected set is output from the tag and data blocks 11a, 11b, and the tag address comparators 15a, 15b compare the remaining sections of the data address on the address bus 101. At the same time, the valid bit V values are read from the tag and data blocks 11a, 11b. If there is a match from either the tag address comparator 15a or the tag address comparator 15b, and if the value of the valid bit V for the corresponding tag and data block 11a or tag and data block 1b is 1, the hit check controller 16 determines that there is a hit.

When the hit check controller 16 determines that there is hit, the way selector 13 to the common bus is controlled and, in the case of a data read operation, the corresponding data from the tag and data block 11a or the tag and data block 11b is output to the common data bus 102. In the case of a data write operation, the data on the common data bus 102 is written to the corresponding data section in the tag and data block 11a or the tag and data block 11b. At the same time, the dirty bit D is also set. When either reading or writing, the contents of the LRU memory 12 are changed to indicate the way for which a hit was determined. Also, the sharing controller 14 compares the processor number of the accessing processor 10a–10d with the corresponding processor number P in the tag and data block 11a or the tag and data block 11b. If they are different, the corresponding shared bit S of the tag and data block 11a or the tag and data block 11b is set. The processor number of the accessing processor 10a–10d is notified to the sharing controller 14 using a section of the address bus 101. Then, when the operation for the shared bit S is completed, the processor number is written to the corresponding processor number P in the tag and data block 11a or the tag and data block 11b.

If the hit check controller 16 determines a miss, the result is sent to the replacement controller 17. The replacement controller 17 reads the corresponding data from the main storage 2 and saves it to the tag and data block 11a or the tag and data block 11b in the set selected using a part of the address on the address bus 101. When doing this, if the valid bit V for either the tag and data block 11a or the tag and data block 11b is 0, then the corresponding block is selected. In other words, new data is stored where invalid data was stored. If the valid bits V for both are 1, the shared bits S are examined. If either bit is 0, the corresponding block is selected. In other words, the new data is stored where data not shared between processors was stored.

With the operations described above, data shared between at least two processors is not removed from the cache, thus allowing the data transfer with the main storage 2 to be reduced. If the shared bits S are both 1 or the shared bits S are both 0, the contents of the LRU memory 12 for the corresponding set is examined and a block is chosen so that the side having the earlier access is removed from the cache. The replacement controller 17 controls the way selector 18 so that the selected block from the tag and data blocks 11a, 11b is connected to the main storage 2. The dirty bit D of the selected block from the tag and data blocks 11a, 11b is checked, and if the dirty bit D is set the current contents of the corresponding data section is written to the main storage 2. Next, for addresses determined by the hit check controller 16 to be a miss, the corresponding data is read from the main storage 2 and is written to the selected block from the tag and data blocks 11a, 11b. Finally, the valid bit V is set, the dirty bit D and the shared bit S are reset, and the corresponding processor number is written to the processor number P. Then, operations similar to those performed for hits are performed and the reading or of the data is completed.

Figure 2:
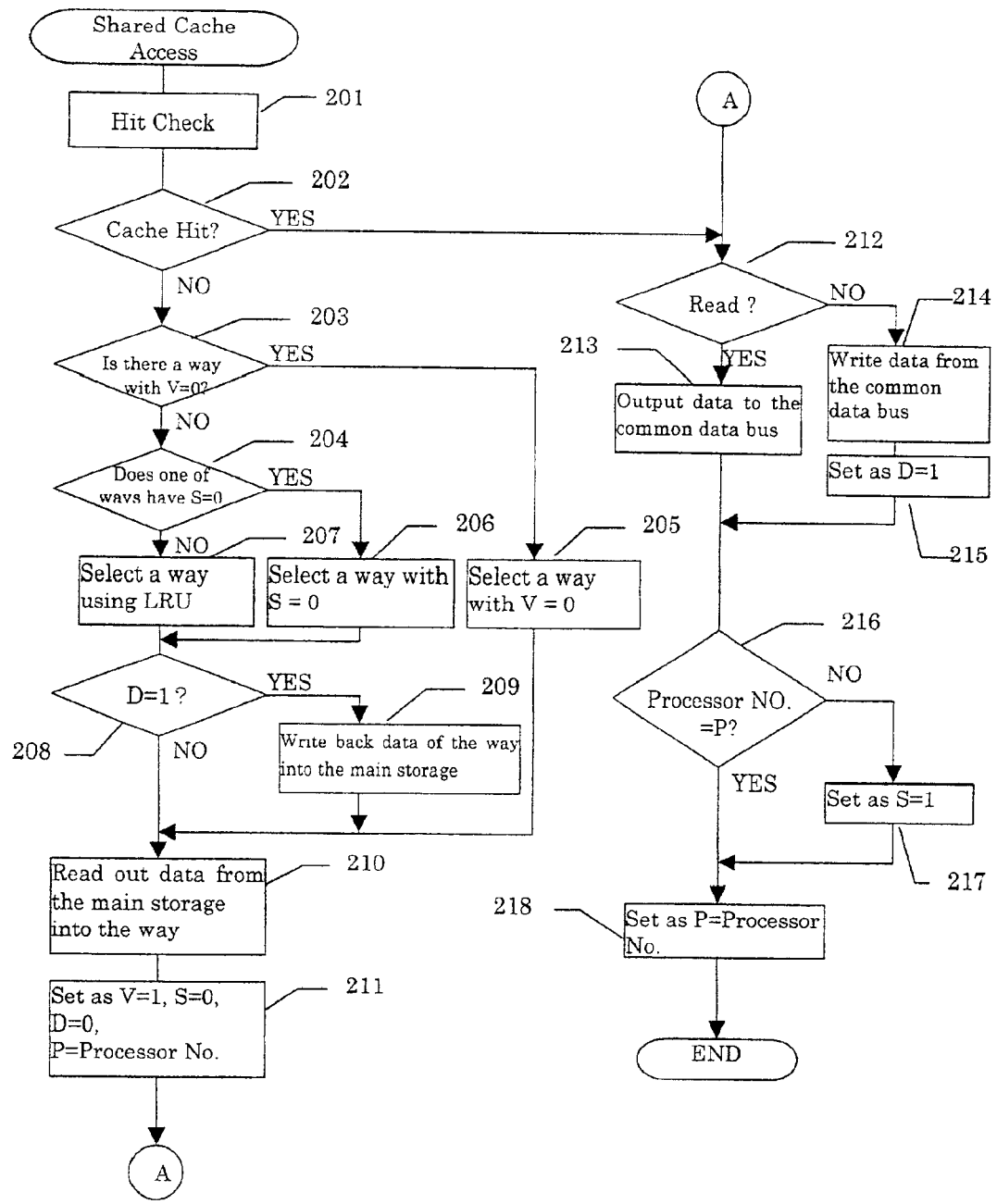
FIG. 2 is a example of flowchart for the purpose of describing a method for controlling cache according to the present invention.

FIG. 2 is a flowchart showing an example of a method for controlling shared cache according to the present invention. The number of ways in the example shown in FIG. 2 is also two. In FIG. 2, when access to the shared cache begins, step 201 checks to see if there is a hit or not. If there is a hit at step 202, control goes to step 212. If there is a miss, control goes to step 203, where the ways are checked to see if there is a way with the valid bit V set to 0. If there is a way with V set to 0, the way is selected at step 205. If there is no way with V set to 0, step 204 checks to see if, out of the two ways, one has the shared bit S set to 0. If S=0, control goes to step 206 and the way with S=0 is selected. If both ways have S=0 or S=1, the LRU is used to select—the way that was used earliest. If three or more ways are to be used, the LRU can be used to select the way that was used earliest if there are at least two ways with S=0.

At step 208, the selected way is checked to see if the dirty bit D is set to 1 or not. If it is set to 1, control goes to step 209, and the contents of the way are written outside the chip, to the corresponding address in the main storage. Control then goes to step 210. If the dirty bit D is set to 0, control goes directly to step 210. At step 210, the newly accessed address contents from the main storage are read and stored to the selected way. Next, at step 211, the valid bit V is set to 1, the shared bit S is set to 0, the dirty bit D is set to 0, and the processor number P is set to the processor number of the processor performing the access. Control then proceeds to step 212 as in the case of a cache hit.

Step 212 checks to see if the access is a read or a write. If the access is a read operation, control goes to step 213. The corresponding data is read from the shared cache and is output to the common data bus. If the access is a write operation, control goes to step 214, where the write data output from the processor is written to the shared cache from the common data bus. Then, at step 215, the dirty bit D is set to 1.

Step 216 is reached from step 213 or step 215, and the processor number of the accessing processor is compared with the recorded processor number P. If the values are different, the shared bit S is set to 1 at step 217. Finally, at step 218, the processor number of the accessing processor is stored in the processor number P and the shared cache accessing operations are completed.

The following is a detailed description of the operations performed by the present invention compared to other systems.

Figure 3:
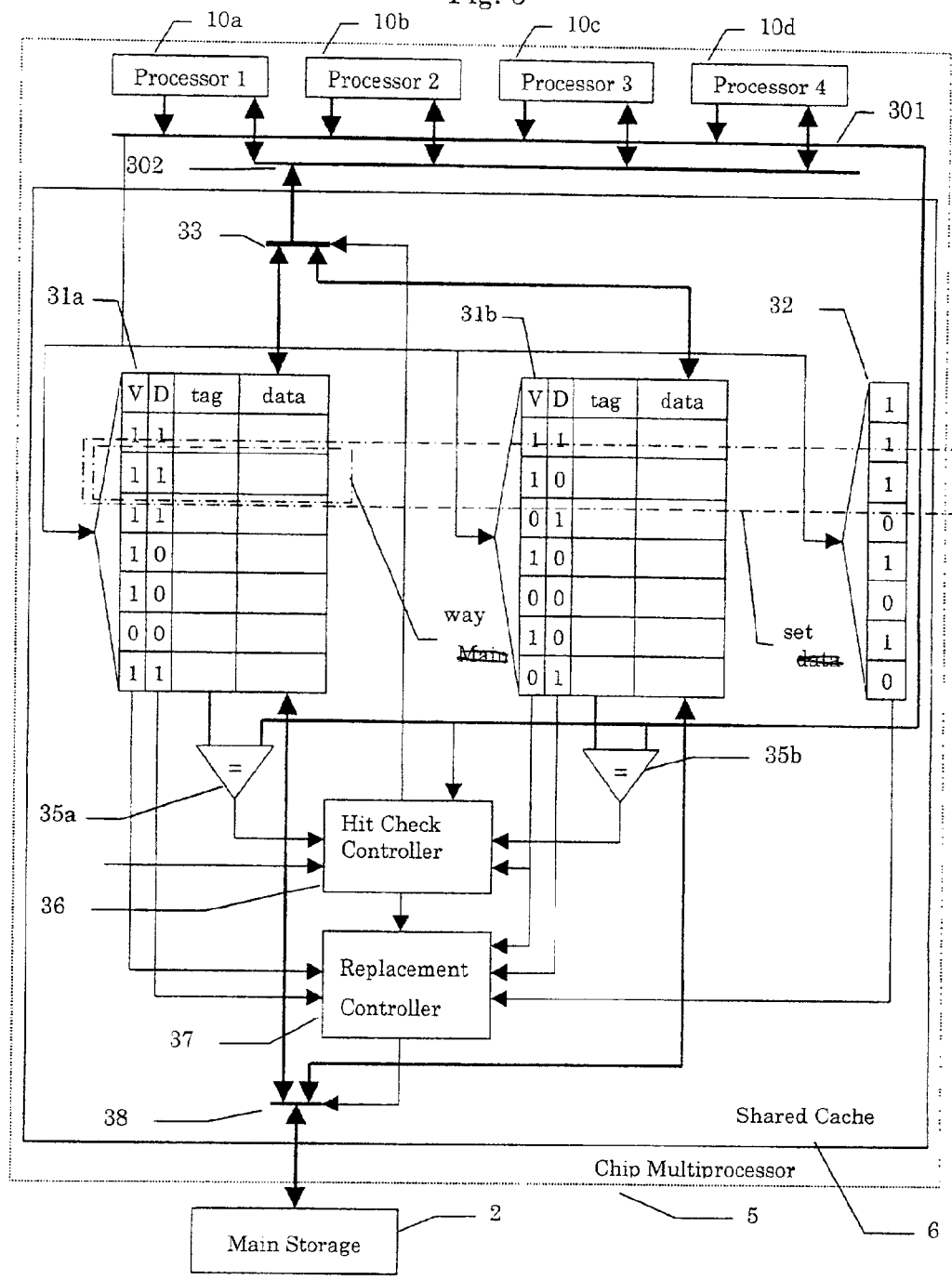
FIG. 3 is a drawing showing the system architecture of a multiprocessor machine according to a comparative example of the present invention.

FIG. 3 is a sample system (comparative example) prepared for comparison with an example of a multiprocessor machine according to the present invention shown in FIG. 1. Compared to the present invention shown in FIG. 1, tag and data blocks 31a, 31b in a shared cache 6 do not contain shared bits S or processor numbers P, and there is also no sharing controller 14. The operations are similar to corresponding operations performed in FIG. 1 except that there are no operations relating to the shared bits S, the processor numbers P, or the sharing controller 14.

Figure 4:
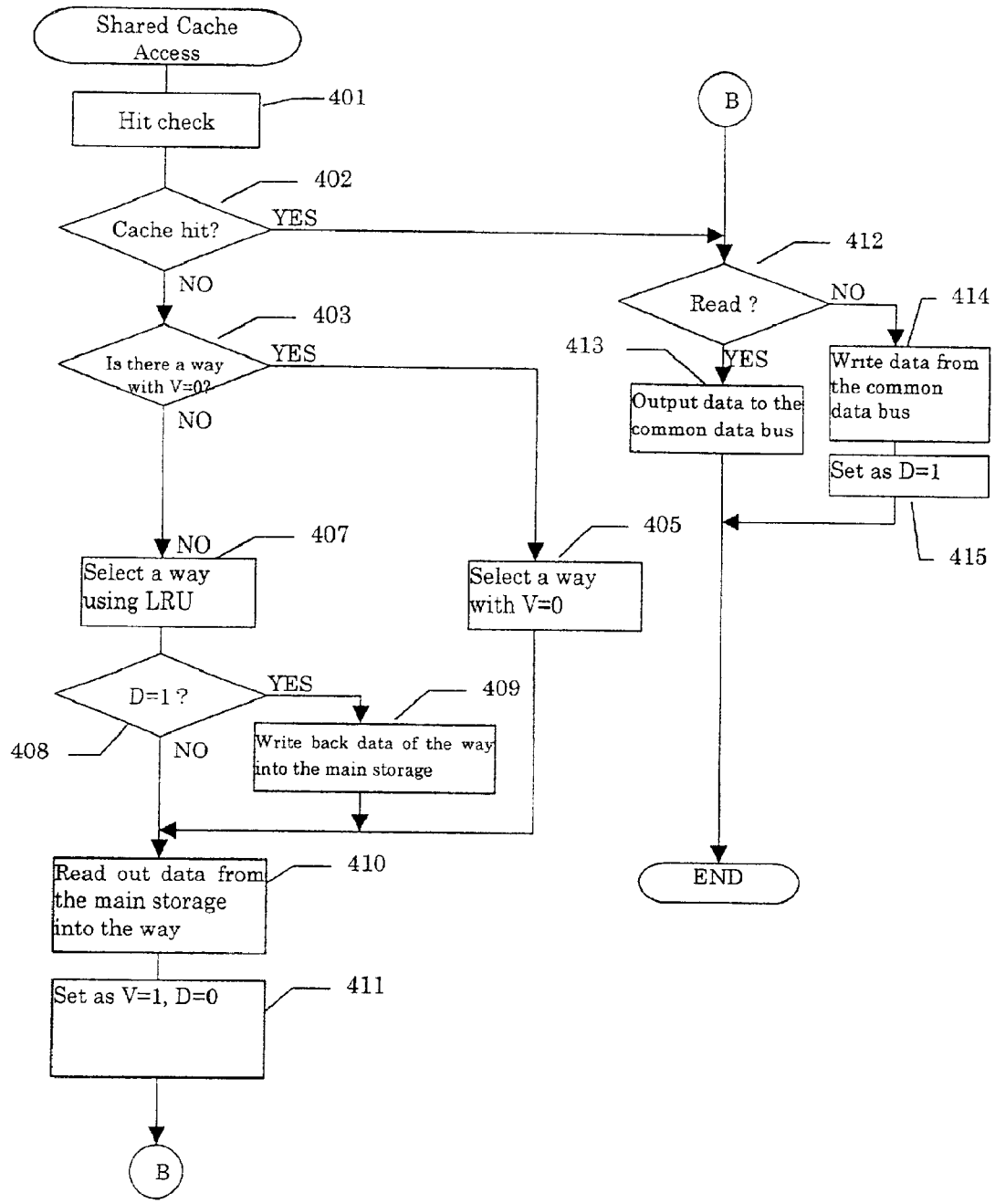
FIG. 4 is a flowchart of a method for controlling cache according to a comparative example of the present invention.

FIG. 4 is a flowchart showing the shared cache control method prepared for comparison with the shared cache control method according to the present invention as shown in FIG. 2. Compared to the example of the present invention indicated in FIG. 2, steps corresponding to steps 204, 206 for selecting ways using the shared bits S are absent. Also, step 411 from FIG. 4 does not include the operations relating to shared bits S as in step 211 from FIG. 2. Furthermore, steps corresponding to steps 216, 217, 218 for setting the shared bit S using the processor number P and storing the accessing processor number are absent.

With these changes, the present invention operates as follows and provides the desired advantages.

FIG. 5 and FIG. 6 are figures for describing the operations of the present invention shown in FIG. 1 and the operations of the comparative example shown in FIG. 3. FIG. 5 shows an example of an operation performed by the present invention. Processors a, b access shared area addresses 0100–0107, and processors c, d access private areas 2100–2107, 3100–3107, 4100–4107, and 5100–5107 in the sequence shown in the figure. To simplify the description, these addresses will correspond to a single set in the shared cache 4. FIG. 5 shows, for each point in time, the addresses of the main storage 2 cached in the set in the tag and data blocks 11a, 11b. In the example of the present invention shown in FIG. 5, the total size of the data transferred from the main storage 2 in the operation shown in the figure is 40 bytes. In contrast, FIG. 6 shows the operations performed by the comparative example from FIG. 3 for the same data accesses as the example shown in FIG. 5. In FIG. 6, the total size of the data transferred from the main storage 2 is 56 bytes, which is 1.4 times the size from FIG. 5.

Figure 7:
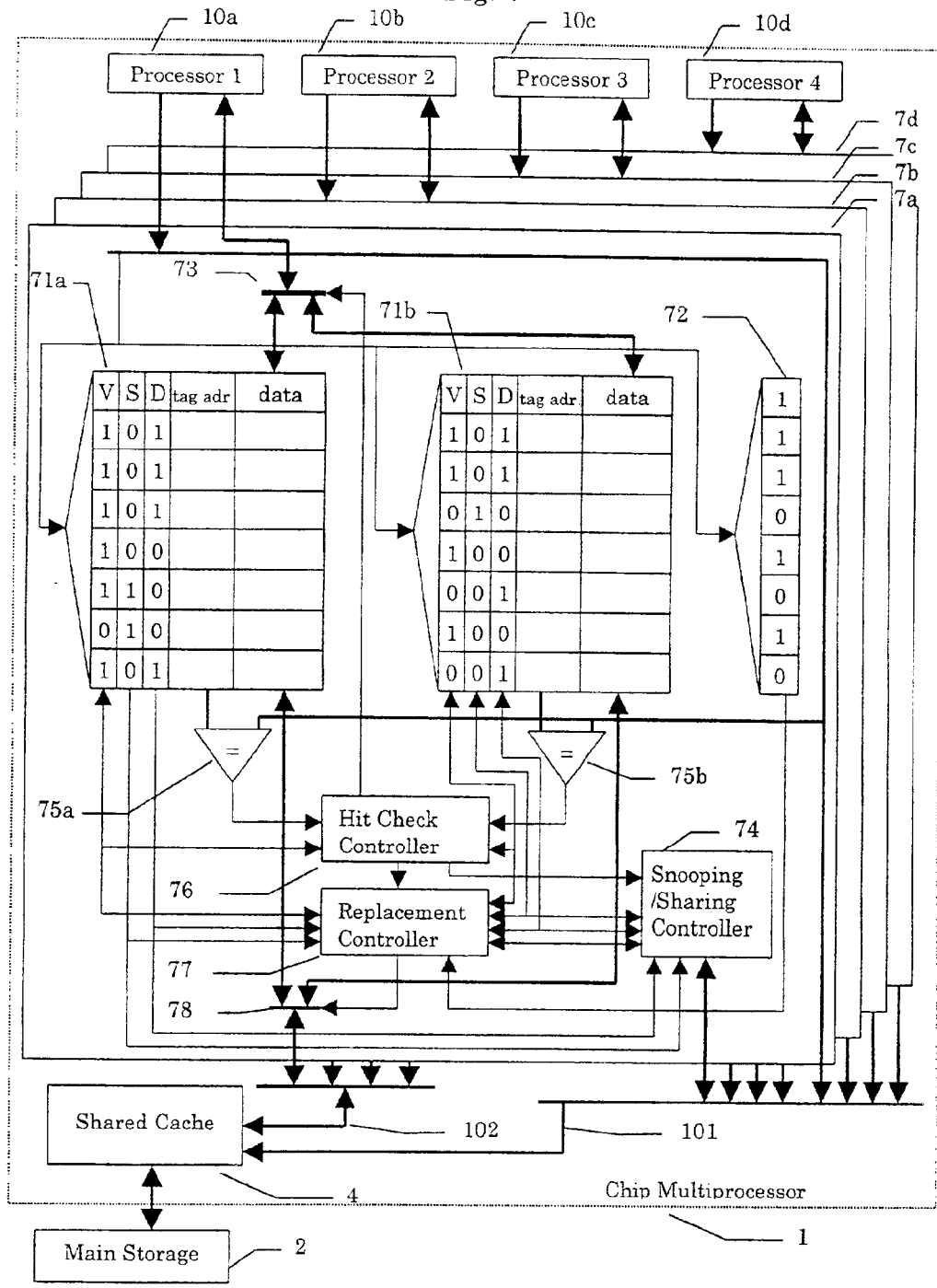
FIG. 7 is a drawing of another system architecture of a multiprocessor system according to the present invention.

FIG. 7 is another example of a multiprocessor machine according to the present invention in which private caches 7a–7d are added to the processors 10a –10d. In FIG. 7, the shared cache 4 is similar to the one from the architecture shown in FIG. 1. The private caches 7a–7d are formed identically and include: two-way tag and data blocks 71a, 71b; an LRU memory 72; a processor way selector 73; a snooping/sharing controller 74; tag address comparators 75a, 75b; a hit check controller 76; a replacement controller 77; and a way selector 78 for the shared cache and external connections. In addition to tag addresses and data, the tag and data blocks 71a, 71b store valid bits V, shared bits S, and dirty bits D. The LRU memory 72 store the most recently accessed way in each set.

The following is a description of operations performed using the private cache 7a added to the processor 10a as an example. When the processor 10a accesses data, a part of the accessed data address is used to select a set to be referenced. Tag addresses are output from the tag and data blocks 71a, 71b for the selected set, and the tag address comparators 75a, 75b compares these with the remaining section of the data address. At the same time, the valid bits V are read from the tag and data blocks 71a, 71b. If the tag address comparator 75a or the tag address comparator 75b show a match and the valid bit V from the corresponding tag and data block 71a or tag and data block 71b is 1, then the hit check controller 76 determines that there is a hit. When the hit check controller 76 determines that there is a hit, the processor way selector 73 is controlled and the corresponding data in the tag and data block 71a or the tag and data block 71b is output if the operation is a data read operation. If the operation is a data write operation, the shared bit S is checked. If it is set to 1, the snooping/sharing controller 74 is notified. The snooping/sharing controller 74 receives the notification and outputs the data write address to the common address bus, and a request is made to invalidate the corresponding data in the private caches 7b–7d of the other processors. Then, the hit check controller 76 resets the shared bit S, writes the corresponding data to the tag and data block 71a or the tag and data block 71b, and sets the dirty bit D. For both read and write operations, the contents of the LRU memory 72 are updated to indicate the way that was determined to be a hit.

If the hit check controller 76 determines that the access is a miss, the result is notified to the replacement controller 77. The replacement controller 77 refers to the corresponding data in the shared cache 4 or the main storage 2. If the corresponding data is stored in the shared cache 4 and the shared bit S in the shared cache 4 is set, then the data in the shared cache 4 is referenced and the contents of the tag and data block 71a or the tag and data block 71b are not updated. Otherwise, the corresponding data is read from the shared cache or the main storage 2 and stored using the operations described below into the set selected based on the part of the data address, in either the tag and data block 71a or the tag and data block 71b.

First, if either valid bit V from the corresponding set in the tag and address block 71a or the tag and address block 71b is 0, that block is selected. If both valid bits V are set to 1, the shared bit S is checked and, if either is set to 1, that block is selected. This allows data in the shared cache 4 that is not shared to be kept while allowing effective use of the fixed data capacity in the tag and data blocks 71a, 71b. If both shared bits S are set to 0, the contents of the LRU memory 72 corresponding to the set are checked and the one with the older access time is selected.

The replacement controller 77 controls the way selector 78 so that the selected block from the tag and data block 71a or the tag and data block 71b is connected to the shared cache 4 or the main storage 2. Also, the dirty bit D of the selected block from the tag and data block 71a or the tag and data block 71b is checked, and if the dirty bit D is set the current contents of the data section is written back to the shared cache 4 or the main storage 2. Next, for addresses determined to be misses by the hit check controller 76, the corresponding data is read from the shared cache 4 or the main storage 2 and is written to the tag and data block 71a or the tag and data block 71b. Finally, the valid bit V is set and the dirty bit D and the shared bit S are reset. Then, operations similar to those performed when there is a hit are performed, and the reading or writing of data is completed.

The snooping/sharing controller 74 monitors, via the common address bus 101, accesses to the shared cache 4 and the main storage 2 from the private caches 71b–71d of the other processors 10b–10d. if an invalidation request is output from another private cache 71b–71d, the corresponding address in the tag and data blocks 71a, 71b is checked, and if the data for the corresponding address is stored, the replacement controller 77 and the like are controlled to invalidate this data. Also, when another private cache 7b–7d accesses the shared cache 4 or the main storage 2 via the common address bus 101, the corresponding address in the tag and data blocks 71a, 71b is checked, and if the corresponding the data for the corresponding address is stored, the corresponding shared bit S is set to 1. Also, if the dirty bit D for the corresponding data is set, this data is output to the common data bus 102 instead of the shared cache 4 or the main storage 2. Furthermore, this data is also written by the replacement controller 77 to the shared cache 4 or the main storage 2, and the dirty bit D is reset.

Figure 8:
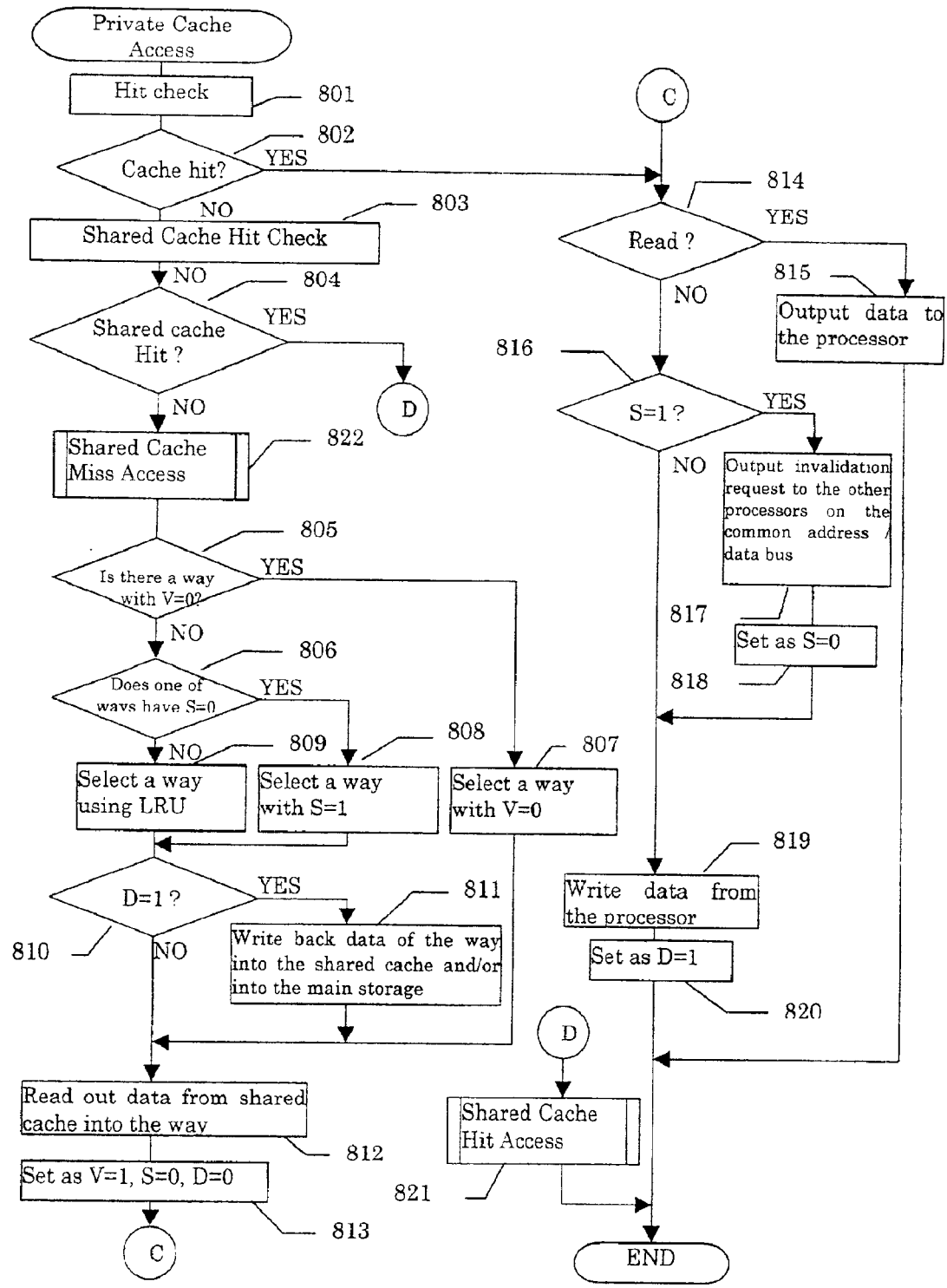
FIG. 8 is a flowchart of another method for controlling cache according to the present invention.

FIG. 8 shows an example of another embodiment of a method for accessing cache according to the present invention, where a method for controlling private cache is added. The example shown in FIG. 8 also uses two ways for private cache.

In FIG. 8, a processor begins access to a private cache, and step 801 performs a hit check to see if there is a hit or not. Next, step 802 branches depending on whether there is a hit or not. If there is a hit, control goes to step 814. If there is a miss, control goes to step 803, and a hit check is performed to determined if there is a hit to the shared cache. Step 804 branches depending on whether there is a hit or not. If the shared cache is hit, control goes to step 821 and the shared cache is accessed. The operations performed for the hit access of the shared cache at step 821 is similar to the operations performed starting with step 212 from FIG. 2.

If step 804 determines that the shared cache is missed, control goes to step 822 and shared cache miss access operations are performed. The shared cache miss access operations at step 822 are similar to the operations performed stating with step 203 from FIG. 2. Then, control goes to step 805 in FIG. 8, and the ways are checked to see if there is a way with private cache having a valid bit V set to 0. If there is a way with the valid bit V set to 0, control goes to step 807, and the way with V set to 0 is selected. If there is no way with valid bit V set to 0, step 806 checks to see if the shared bit S is set to 1 for just one way. If only one way has S=1, then control goes to step 808, where the way with S=1 is selected. If both ways have S=1 or S=0, then control goes to step 809, and the way that was used earliest, based on the LRU, is selected. In embodiments using three or more ways, the way that was used earliest, based on the LRU, is selected if there are at least two ways with S=1. Next, step 810 checks the selected way to see if the dirty bit D is set to 1 or not. If the dirty bit D is set to 1, control goes to step 811 and the contents of the way are written to the shared cache or the main storage. Then, at step 812, this data is read from the shared cache and stored in the selected way. At step 813, the valid bit V is set to 1, the shared bit S is set to 0, the dirty bit D is set to 0, and control proceeds to step 814. Step 814 checks to see if this access is read or write. If it is a read operation, control goes to step 815, and this data is output to the processor.

If the operation is a write operation, control proceeds to step 816, and the shared bit S is checked to see if it is set to 1 or not. If the shared bit S is set to 1, control goes to step 817, and cache invalidation requests for this data are output to the common bus for the other processors. Then, at step 818, the shared bit S is set to 0.

Next, at step 819, the write data output from the processor is written to the private cache. Then, the dirty bit D is set to 1 at step 820, and the operation is completed.

The following is a detailed description of the operations of the present invention, with the addition of private caches, compared with the comparative example.

Figure 9:
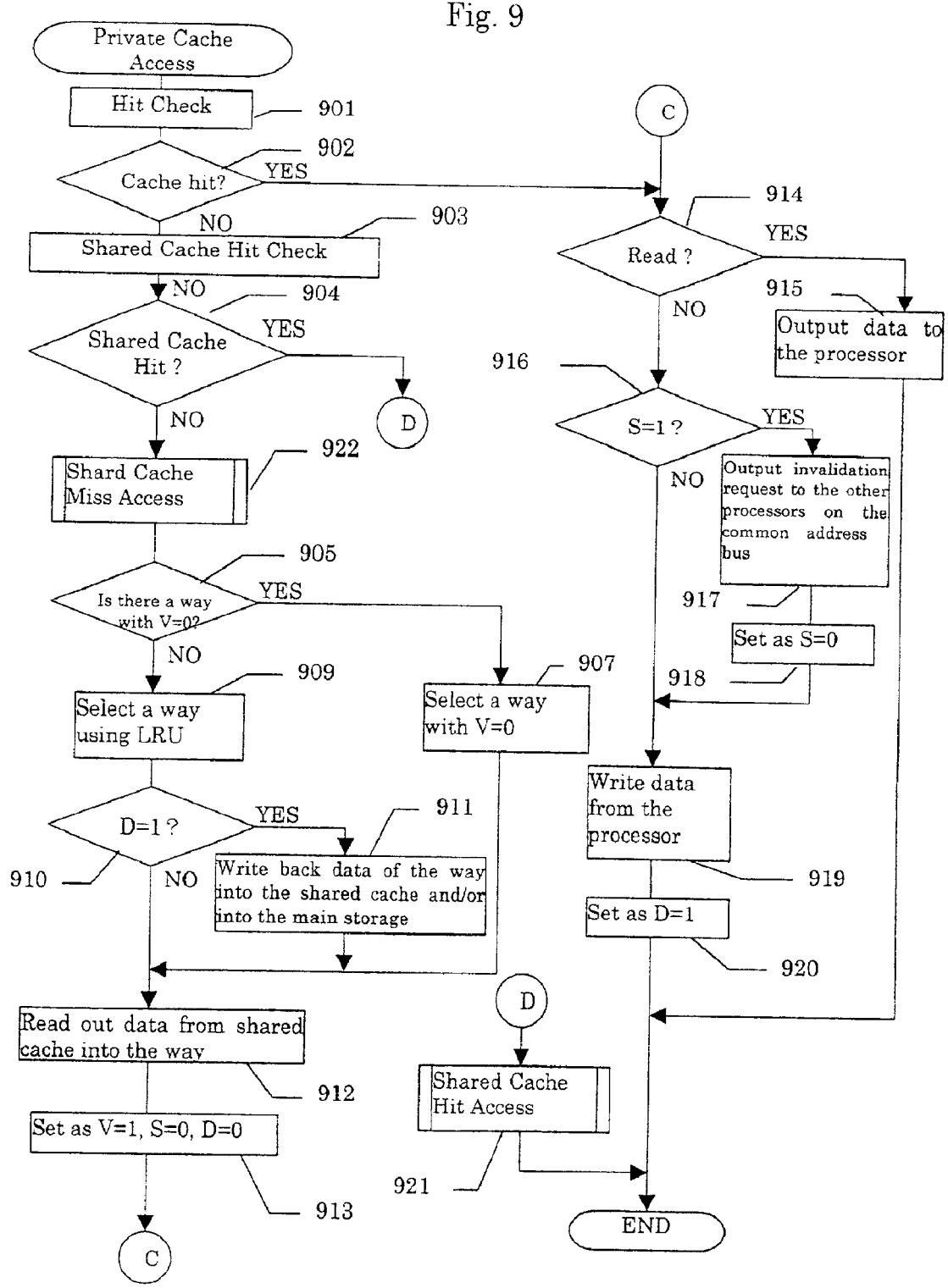
FIG. 9 is a flowchart of a method for controlling cache according to a comparative example of the present invention.

FIG. 9 shows an example of a cache control method prepared for comparison with the cache control method of the present invention, as shown in FIG. 8. In comparison with the present invention shown in FIG. 8, the steps for selecting a way based on the shared bit S, corresponding to steps 806, 808, are omitted. Furthermore, the shared cache access at steps 921, 922 are equivalent to the operations beginning with steps 412, 403 from the comparative example shown in FIG. 4.

With these differences, the present invention with private caches performs the operations described below and provides the desired advantages.

FIG. 10 and FIG. 11 are drawings for the purpose of describing the operations performed in the cache control method according to the present invention shown in FIG. 8 and the operations performed in the cache control method of the comparative example shown in FIG. 9. FIG. 10 is an example of how the present invention operates. Private caches 7a, 7b are the private caches for the processors a, b, respectively. The tag and data blocks 71a, 71b are the two blocks in the private cache 7a. The figure also shows the shared cache 4 and the main storage 2. The processor a, b access the shared area addresses 0100–0107, and then the processor a accesses the private area 2100–2107, the shared area 0100–0107, the private area 3100–3107, 2100–2107, and 3100–3107, in the sequence shown in the figure. To simplify the description, these addresses correspond to a single set in the private cache 7a. The figure shows, for each point in time, the addresses of the main storage 2 cached in the set. In the example shown in FIG. 10, the total size of the data transferred from the main storage 2 in the sample operations shown in the figure is 24 bytes. FIG. 11 shows the operations performed by the comparative example from FIG. 9 for the same data accesses as shown in FIG. 10. In FIG. 11, the total data size transferred from the main storage 2 is 32 bytes, which is 4/3 the size from FIG. 10.

With the present invention, the cache in a multiprocessor machine can be controlled so that the data is transferred between the cache and main storage is reduced. In a system where multiprocessors and cache are integrated on-chip, the data communication between the chip and external components can be reduced.

What is claimed is:

1. A multiprocessor machine comprising: a plurality of processors; a first cache shared by said plurality of processors; and a first controller providing control so that data accessed by at least two processors out of said plurality of processors is given higher priority in being saved to said first cache compared to data accessed by only one of said plurality of processors;

second caches associated with each of said plurality of processors; and a second controller providing control so that, when data stored in a second cache is accessed by a processor other than a processor associated with said second cache, said data is not stored in said second cache with a higher priority compared to data accessed only by said processor associated with said second cache.

2. A multiprocessor machine as described in claim 1 wherein said plurality of processors and said first cache and said controller and said second cache and said second controller are integrated on a single LSI.

3. A multiprocessor machine as described in claim 1 wherein said second controller includes second selecting means which, if storing new data to said second cache and there is an area in said second cache containing data accessed by a processor other than a processor associated with said second cache, selects said area in said second cache over an area containing data accessed by only said processor associated with said second cache.

4. A multiprocessor machine comprising: a plurality of processors; a first cache shared by said plurality of processors; and a first controller providing control so that data accessed by at least two processors out of said plurality of processors is given higher Priority in being saved to said first cache compared to data accessed by only one of said plurality of processors, wherein said first controller includes first selecting means which, if storing new data to said first cache and there is an area in said first cache containing data not accessed by at least two processors of aid plurality of processors, selects said area in said first cache over an area containing data accessed by at least two processors of said plurality of processors.

5. A method for controlling cache comprising:

a first step evaluating whether data stored in a cache shared by a plurality of processors is accessed by at least two processors from said plurality of processors;

a second step selecting an area determined by said first step to not be accessed by at least two processors when storing new data to said cache;

a third step selecting an area in said cache if no area can be selected in said second step; and a fourth step storing said new data in said cache area selected by either said second step or said third step.

6. A method for controlling cache as described in claim 5 wherein said third step selects an area containing data with the lowest number of accessing processors.

7. A processor system comprising: a plurality of processors; a cache memory accessible by at least two processors of said plurality of processors; a first bus connecting said plurality of processors and said cache memory; a main storage memory exchanging data with said cache memory; a second bus connecting said cache memory and said main storage memory; a sharing evaluation module evaluating whether data stored in said cache memory is accessed by at least two processors and adding attributes to said data; and a replacement controller selecting data in said cache memory determined to not be accessed by at least two processors based on said attributes over data determined to be accessed by at least two processors, and replacing data in said main storage memory with said selected data.

8. A processor system as described in claim 7 wherein said cache memory includes a plurality of sets, said sets containing information indicating whether data in said sets is use by a plurality of processors.

9. A processor system as described in claim 8 wherein said sets include information indicating validity of data and information indicating whether data was rewritten.

10. A processor system as described in claim 9 wherein said sets include an identifier of a processor that last accessed said data.

11. A processor system as described in claim 10 wherein said replacement controller selects an area of said cache memory to replace data in said main storage memory based on said information indicating whether data in said set is use by a plurality of processors, said information indicating validity of data, and said information indicating whether data was rewritten.

* * * * *